3,641,208
TRANSPARENT COMPOSITIONS OF VINYL HALIDE POLYMERS AND TERTIARY ALKYL STYRENE - ACRYLONITRILE - BUTADIENE RUBBER POLYMERS AND METHOD OF MAKING THE SAME
Richard H. Hall and Carleton W. Roberts, Midland, Andrew J. Sikkema, Farwell, and Junior J. Lamson, Bay City, Mich., assignors to The Dow Chemical Company, Midland, Mich.
No Drawing. Continuation-in-part of abandoned application Ser. No. 611,822, Jan. 26, 1967. This application Nov. 17, 1969, Ser. No. 877,518
Int. Cl. C08f 41/12, 19/08
U.S. Cl. 260—876 R  17 Claims

ABSTRACT OF THE DISCLOSURE

Transparent compositions of matter comprising fusion blends of vinyl chloride polymers and resinous copolymers of a tertiary alkyl styrene, acrylonitrile and a butadiene polymer, e.g., polybutadiene.

This application is a continuation-in-part of copending application Ser. No. 611,822, filed Jan. 26, 1967, now abandoned.

This invention concerns compositions comprising one or more vinyl halide polymers intimately incorporated with certain resinous ABS-type polymers consisting essentially of a graft copolymer or an interpolymer of a tertiary alkyl styrene and acrylonitrile upon a rubbery butadiene polymer, e.g., polybutadiene, or a rubbery copolymer of a predominant amount of butadiene. The compositions are thermoplastic products suitable for molding into transparent, tough, flame-resistant articles, having good tensile strength, impact strength, and heat distortion properties.

It is known to prepare thermoplastic compositions by intimately incorporating, e.g., by fusion blending, a vinyl chloride polymer with a rubbery copolymer of butadiene and acrylonitrile or styrene, a resinous copolymer of styrene and acrylonitrile, or both a rubbery copolymer of butadiene and acrylonitrile and a resinous copolymer of styrene and acrylonitrile, or with a graft copolymer of styrene and acrylonitrile upon a rubbery butadiene polymer. The compositions are readily processable, have high impact strength and shock resistance and are useful for a variety of purposes.

However, the compositions are, in general, translucent to opaque products and often have heat distortion properties that are lower than is desired for many uses.

It is an object of the invention to provide vinyl chloride polymer compositions that are readily processable to form transparent, tough, flame-resistant articles having good resistance to discoloring, high impact strength, and high heat distortion properties. Another object is to provide transparent, vinyl chloride polymer compositions suitable for making self-extinguishing articles having good physical properties. Other and related objects will appear from the following description of the invention.

According to the invention, vinyl chloride polymer compositions having good transparency, high heat distortion temperature and good flame-retardance can readily be prepared by intimately incorporating, e.g. by fusion blending, (1) a vinyl chloride polymer with (2) a graft copolymer or an interpolymer of (a) a vinyl aromatic monomeric material wherein at least about 50 percent of the aryl groups are substituted with a tertiary alkyl group containing from 4 to 8 carbon atoms, (b) acrylonitrile, or methacrylonitrile and (c) a rubbery butadiene polymer, e.g., a homopolymer of butadiene, or a copolymer of at least 50 percent by weight butadiene and not more than 50 percent by weight of styrene or at least 75 percent by weight butadiene and not more than 25 percent by weight of acrylonitrile or mixtures thereof.

The vinyl chloride polymers to be employed are homopolymers of vinyl chloride and copolymers containing at least 80 weight percent of vinyl chloride in the polymer, and not more than 20 percent by weight of one or more other monoethylenically unsaturated monomers such as vinylidene chloride, vinyl acetate, vinyl propionate, or acrylic and methacrylic acids and/or their alkyl esters having from 1 to 8 carbon atoms in the alkyl group, or acrylonitrile. Among suitable acrylates are methyl acrylate, methyl methacrylate, butyl acrylate, butyl methacrylate, 2-ethylhexyl methacrylate, and 2-ethylhexyl acrylate, fumarates, maleates and itaconates.

Specific vinyl chloride polymers found to be useful include:

(A) Copolymer of 86 weight percent vinyl chloride and 14 weight percent vinyl acetate.
(B) Copolymer of 86 weight percent vinyl chloride, 13 weight percent vinyl acetate and 1 weight percent acrylic acid.
(C) Copolymer of 90.5 weight percent vinyl chloride and 10.5 weight percent glycidyl acrylate.
(D) Copolymer of 88 weight percent vinyl chloride and 12 weight percent ethyl acid.
(F) Copolymer of 95 weight percent vinyl chloride and 5 weight percent propylene oxide-$\beta$-hydroxyethylacrylate.

The rubber reinforced polymer starting materials are graft copolymers or ABS-type interpolymers of a tertiary alkyl styrene, acrylonitrile or methacrylonitrile, and rubbery butadiene polymers, containing between about 65 and 85 parts by weight of a vinyl aromatic monomeric material wherein at least about 50 percent of the aryl groups are substituted with a tertiary alkyl group containing from 4 to 8 carbon atoms, including tertiary alkyl styrenes having from 4 to 8 carbon atoms in the alkyl group directly attached to a carbon atom in the aromatic nucleus and mixtures thereof with styrene or chlorinated styrene; between about 10 and 20 parts by weight of acrylonitrile or methacrylonitrile; and between about 5 and 15 parts by weight of a butadiene polymer that is an elastomeric reinforcing material. Such ABS-type interpolymers when fusion blended with the vinyl chloride polymer provides thermoplastic compositions having a combination of desired properties. Stated differently, deviation from the stated composition by change of copolymer composition, or amount, will adversely affect one or more of the desirable properties of the product.

It has also been discovered that desirably transparent polymeric compositions, as described herein, but containing up to 50 parts by weight of the polymeric butadiene elastomeric reinforcing material can be obtained wherein such elastomeric reinforcing material is added to the remaining polymeric ingredients while in the form of a latex. When using about 50 parts of such elastomeric reinforcing material it is desirable to use up to about 30 parts by weight of acrylonitrile or methacrylonitrile to maintain desirable solvent resistance of the so-formed polymeric composition.

The rubbery butadiene polymer to be used with the vinyl aromatic monomeric material and acrylonitrile or methacrylonitrile in preparing the ABS-type interpolymer starting material can be an elastomeric homopolymer of butadiene or a copolymer obtained by the polymerization of conjugated diolefin hydrocarbons such as butadiene, isoprene, or dimethylbutadiene, or a rubbery copolymer of butadiene and styrene or a butadiene-acrylonitrile rubber. Stereospecific polybutadiene and stereospecific copolymers of a predominant amount by weight, i.e. 50 percent by weight or more, of butadiene and a minor or lesser amount of styrene, or at least 75 weight percent butadiene and not more than 25 weight percent of acrylonitrile, are preferred.

The vinyl chloride polymer compositions can be prepared by fusion blending, e.g. by heat plastifying and mechanically working, the polymeric ingredients in admixture with one another as by compounding the polymeric ingredients on heated rolls, in a Banbury mixer, or in a plastics extruder, at temperatures between about 140° C. and 240° C. until a homogeneous and uniform composition is obtained. In general, compounding the heat plastified ingredients for periods of from 1 to 20 minutes at the aforementioned temperatures is satisfactory. The ingredients should not be compounded at the elevated temperatures for such prolonged periods of time as to result in appreciable deterioration or breakdown of the polymeric ingredients. After fusion blending, the composition is cooled and ground to a granular form suitable for molding.

Alternatively, such materials may be directly added to a screw type injection machine, or may be blended while in the form of polymeric latexes.

The compositions may contain small amounts, suitably from about 1 to 5 weight percent based on the weight of the composition, of a stabilizing agent, or other additive intimately incorporated therewith. Suitable stabilizing agents are: basic lead carbonate, lead orthosilicate, cadmium are: basic lead carbonate, lead orthosilicate, cadmium ricinoleate, barium cadmium laurate, dibutyl tin mercaptide, cadmium 2-ethyl hexate, sodium ricinoleate, and sulfur containing organotin compounds such as dibutyl tin S,S' - bis(3,5,5 - trimethylhexylmercaptoacetate) described in U.S. Pat. No. 3,648,650.

Other additives such as plasticizers, flow agents, mold release agents, dyes, pigments, or lubricants, can be used, in amounts of from 0.5 to 20 percent by weight of the composition, but such additives are not required.

The new compositions are easily processable, to form transparent, tough, flame-resistant to self-extinguishing articles possessing excellent heat distortion and mechanical properties. The compositions can be molded to form transparent sheet, film, rod, tape, strip, boxes, cups, and containers, which are useful for a variety of purposes. The compositions may be used to make foamed articles by utilizing techniques known to the art.

The following examples illustrate ways in which the principle of the invention has been applied, but are not to be construed as limiting its scope.

EXAMPLE 1

A charge of 50 parts by weight of polyvinyl chloride containing 3 percent by weight of dibutyltin S,S'-bis(3,5,5 - trimethylhexylmercaptoacetate) as heat stabilizing agent, was milled on a pair of heated compounding rolls at a temperature of 180° C. until melted and sheeted out. Thereafter, 50 parts by weight of a powdered resinous copolymer prepared by polymerizing a solution of 15 parts by weight of stereospecific polybutadiene consisting of over 90 percent 1,4-addition and about 7.5 percent vinyl structure with the cis-1,4 configuration comprising about 32 to 35 percent, and having a Mooney number of 35, dissolved in 68 parts by weight of para-tert.-butylstyrene and 17 parts by weight of acrylonitrile, was added. The resulting mixture was compounded on the heated rolls at 180° C. for a period of 20 minutes then was sheeted out and was removed from the rolls and was allowed to cool to room temperature. It was crushed to a granular form suitable for molding. Portions of the composition were injection molded to form test pieces of ⅛ x ½ inch cross-section. These test pieces were used to determine the tensile strength and elongation values for the product employing procedures similar to those described in ASTM D638-49T. Other test pieces were used to determine impact strength employing procedure similar to that described in ASTM D256-47T. The heat distortion temperatures for the composition was determined by a procedure similar to that of Vicat (see German Industrial Standard Din-Blatt 57302, Beuth Vertrieb—F.m.b.H., Berlin W. 15). The product had the properties:

Tensile strength: 7190 lb./sq. in.
Elongation: 22.4 percent
Notched impact strength: 6.34 ft.-lbs.
Vicat softening point: 223° F.
Color: Transparent By way of comparison, in each of a series of additional experiments, the experiment as specifically described above was repeated using one of styrene, vinyl toluene, vinyl xylene and ethylvinyl toluene as a replacement for the para-tertiary butyl styrene component of the resinous copolymer. In each instance the resulting polymer blend was opaque when injection molded. In yet another series of experiments, utilization of vinyl aromatic monomeric materials composed of mixtures of styrene and tertiary octylstyrene in amounts wherein about 50 percent of the aryl groups were substituted with a tertiary octyl group produced desirably transparent polymeric compositions. By way of comparison, otherwise identical compositions wherein such styrene-tertiary octylstyrene mixtures had less than 50 percent of the aryl groups substituted with a tertiary octyl group were less transparent.

EXAMPLE 2

(A) A solution was prepared by dissolving in 74 parts by weight of tert.-octylstyrene prepared by dehydrating p-(1-ethyl-1-methyl)-pentyl-α-methyl benzyl alcohol, 10 parts by weight of a stereospecific polybutadiene rubber having a Mooney number ML 1+4 (212° F.) of 35, and consisting of over 90 percent 1,4 addition and only about 7.5 percent vinyl structure, the cis-1,4 configuration comprising 32 to 35 percent of the polymer, and which polybutadiene rubber was of narrow molecular weight distribution, and adding thereto 16 parts by weight of acrylonitrile. The solution was heated in a closed elongated vessel and was agitated by rotating or tumbling of the vessel end over end to polymerize the monomer under time and temperature conditions as follows: 3 days at 95° C.; 3 days at 115° C.; and 1 day at 140° C. The polymer was removed from the container and was ground to a granular form. The ground polymer was heated in a vacuum oven at 150-160° C. under 1.5 millimeters absolute pressure for a period of 16 hours to remove volatile ingredients, then was cooled and crushed to a granular form. Portions of the product were injection molded to form test pieces 0.1 inch thick. The moldings were transparent and had good mechanical properties.

(B) A charge of 50 parts by weight of polyvinyl chloride was heat-plastified and sheeted out by compounding on a pair of heated rolls. Thereafter, 50 parts by weight of the resinous copolymer prepared in part A of this example was added. The resulting mixture was compounded on the heated rolls at a temperature of 180- C. for a period of 20 minutes. It was then sheeted out and removed from the rolls. After cooling, the product was ground to a granular form. Test pieces were compression molded from the granular product. The product had good mechanical properties and was transparent.

EXAMPLE 3

(A) A solution was prepared by dissolving in 74 parts by weight of tert.-amylstyrene, 10 parts by weight of a stereospecific polybutadiene rubber having a Mooney number ML 1+4 (212° F.) of 35, and consisting of over 90 percent 1,4 addition and only about 7.5 percent vinyl structure, the cis-1,4 configuration comprising 32 to 35 percent of the polymer, and which polybutadiene rubber was of narrow molecular weight distribution, and adding thereto 16 parts by weight of acrylonitrile. The solution was heated in a closed elongated vessel and was agitated by rotating or tumbling of the vessel end over end to polymerize the monomer under time and temperature conditions as follows: 3 days at 95° C.; 3 days at 115° C.; and 1 day at 140° C. The polymer was removed from the container and was ground to a granular form. The ground polymer was heated in a vacuum oven at 150–160° C. under 1.5 millimeters absolute pressure for a period of 16 hours to remove volatile ingredients, then was cooled and crushed to a granular form. Portions of the product were injection molded, to form test pieces 0.1 inch thick. The moldings were transparent and had good tensile strength, impact strength and a high heat distortion temperature.

(B) A transparent product having good physical properties and similar to that obtained in Part A of this example is obtained when tert.-hexylstyrene is used in place of the tert.-amylstyrene employed in part A.

(C) A charge of 50 parts by weight of polyvinyl chloride was heat-plastified and sheeted out by compounding on a pair of heated rolls. Thereafter, 50 parts by weight of the resinous copolymer prepared in part B of this example was added. The resulting mixture was compounded on the heated rolls of a temperature of 180° C. for a period of 20 minutes. It was then sheeted out and removed from the rolls. After cooling, the product was grounded to a granular form. Test pieces were compression molded from the granular product. The product had good mechanical properties and was transparent.

EXAMPLE 4

To a mixture of 81 parts by weight of tertiary butyl styrene and 19 parts by weight of acrylonitrile contained in a citrate bottle was added 10 parts of a 10 parts by weight of a copolymer of from 82–78 parts by weight of butadiene and 18–22 parts by weight of acrylonitrile.

The mixture was polymerized at 90° C. for two days then transferred to an air oven and the polymerization continued at 140° C. for 24 hours. Thereafter, the polymeric material was separated from the bottle, pulverized and devolatilized, then fusion blended with equal weight amounts of polyvinyl chloride. The mixture, when injection molded, was transparent and had excellent physical strength properties.

EXAMPLE 5

An interpolymer was prepared, using constant monomer addition techniques by the polymerization at 60° C. of a monomer charge consisting of 20 weight percent polybutadiene, 26.6 weight percent acrylonitrile, 26.7 weight percent of tertiary butyl styrene and 26.7 weight percent of chlorostyrene. The interpolymer was characterized by a melt viscosity $\eta_7$ Poise of greater than 50,000, a method impact in ft.-lbs. per inch of 4.9, and a heat distortion, Vicat ° F. of 259.

This material was fusion blended with equal weight amounts of polyvinylchloride to form a transparent injection molding having excellent strength properties.

What is claimed is:

1. A composition consisting essentially of an intimate admixture of
   (1) between about 40 and 60 parts by weight of a vinyl chloride polymer containing at least 80 weight percent of polymerized vinyl chloride and not more than 20 weight percent of at least one other monoethylenically unsaturated monomer copolymerized therewith, and
   (2) between about 60 and 40 parts by weight of a resinous copolymer containing in chemically combined form:
      (a) between about 65 and 85 parts by weight of a vinyl aromatic monomeric material wherein at least about 50 percent of the aryl groups are substituted with a tertiary alkyl group containing from 4 to 8 carbon atoms,
      (b) between about 10 and 30 parts by weight of acrylonitrile or methacrylonitrile and
      (c) between about 5 and 50 parts by weight of a rubbery butadiene polymer selected from the group consisting of copolymers containing in chemically combined form at least 50 percent by weight of butadiene and not more than 50 percent by weight of styrene and copolymers containing at least about 75 percent by weight of butadiene and not more than 25 weight percent of acrylonitrile.

2. A composition as claimed in claim 1 wherein the vinyl chloride polymer is polyvinyl chloride.

3. A composition as claimed in claim 1 wherein the vinyl aromatic monomeric material is tertiary butyl styrene.

4. A composition as claimed in claim 1 wherein the butadiene polymer is stereospecific polybutadiene.

5. A composition as claimed in claim 1 wherein the butadiene polymer is a copolymer of at least 60 percent by weight of butadiene and not more than 40 percent of styrene.

6. A composition as claimed in claim 1 wherein the vinyl aromatic monomeric material is tertiary octylstyrene.

7. A composition as claimed in claim 1 wherein the vinyl aromatic monomeric material is tertiary amyl styrene.

8. A composition as claimed in claim 1 wherein the vinylaromatic monomeric material is a mixture of styrene and a tertiary alkylstyrene, wherein said alkyl group contains from 4 to 8 carbon atoms.

9. A method of making a transparent, resinous, flame-resistant thermoplastic composition which method consists essentially of intimately incorporating by fusion blending (1) between about 60 and 40 parts by weight of a vinyl chloride polymer containing at least 80 weight percent of polymerized vinyl chloride and not more than 20 weight percent of at least one other monoethylenically unsaturated monomer copolymerized therewith, with (2) between about 40 and 60 parts by weight of a resinous copolymer containing in chemically combined form:
   (a) between about 65 and 85 parts by weight of a vinyl aromatic monomeric material wherein at least about 50 percent of the aryl groups are substituted with a tertiary alkyl group containing from 4 to 8 carbon atoms,
   (b) between about 10 and 20 parts by weight of acrylonitrile or methacrylonitrile and
   (c) between about 5 and 15 parts by weight of a rubbery butadiene polymer selected from the group consisting of copolymers containing in chemically combined form at least 50 percent of butadiene and not more than 50 percent by weight of styrene and copolymers containing at least about 75 percent by weight of butadiene and not more than 25 weight percent of acrylonitrile.

10. A method as claimed in claim 9 wherein the vinyl chloride polymer is polyvinyl chloride.

11. A method as claimed in claim 9 wherein the vinyl aromatic monomeric material is tertiary butyl styrene.

12. A method as claimed in claim 9 wherein said butadiene polymer is stereospecific polybutadiene.

13. A method as claimed in claim 9 wherein said butadiene polymer is a copolymer of at least 60 percent by weight of a predominant amount of butadiene and not more than 40 percent of styrene.

14. A method as claimed in claim 9 wherein the vinyl aromatic monomeric material is tertiary octylstyrene.

15. A method as claimed in claim 9 wherein the vinyl aromatic monomeric material is tertiary amyl styrene.

16. A method as claimed in claim 9 wherein the vinyl aromatic monomeric material is a mixture of styrene and tertiary octylstyrene.

17. A method of making a transparent, resinous, flame-resistant thermoplastic composition which method consists essentially of intimately incorporating by fusion blending (1) between about 60 and 40 parts by weight of a vinyl chloride polymer containing at least 80 weight percent of polymerized vinyl chloride and not more than 20 weight percent of at least one other monoethylenically unsaturated monomer copolymerized therewith, with (2) between about 40 and 60 part by weight of a resinous copolymer containing in chemically combined form:
  (a) between about 65 and 85 parts by weight of a vinyl aromatic monomeric material wherein at least about 50 percent of the aryl groups are substituted with a tertiary alkyl group containing from 4 to 8 carbon atoms,
  (b) between about 10 and 20 parts by weight of acrylonitrile or methacrylonitrile and
  (c) between about 5 and 50 parts by weight of a rubbery butadiene polymer selected from the group consisting of copolymers containing in chemically combined form at least 50 percent of butadiene and not more than 50 percent by weight of styrene and copolymers containing at least about 75 percent by weight of butadiene and not more than 25 weight percent of acrylonitrile, wherein said rubbery butadiene polymer is in the form of a latex when admixed with the remaining polymeric constituents.

References Cited

UNITED STATES PATENTS

| 2,943,075 | 6/1960 | Schweitzer | 260—880 X |
| 3,278,642 | 10/1966 | Lee | 260—880 |
| 3,406,136 | 10/1968 | Scarso et al. | 260—876 X |
| 3,426,103 | 2/1969 | Hall et al. | 260—880 |

FOREIGN PATENTS

| 886,343 | 1/1962 | Great Britain | 260—876 |

MURRAY TILLMAN, Primary Examiner

H. W. ROBERTS, Assistant Examiner

U.S. Cl. X.R.

260—23.7 H, 48.75 R K, 880 R, 893

PO-1050
(5/69)

UNITED STATES PATENT OFFICE
CERTIFICATE OF CORRECTION

Patent No. 3,641,208          Dated    8 February 1972

Inventor(s)    Richard H. Hall, Carleton W. Roberts, Andrew J. Sikkema, and Junior J. Lamson It is certified that error appears in the above-identified patent and that said Letters Patent are hereby corrected as shown below:

Column 2, insert the following between lines 28 and 29:

--E. Copolymer of 90 weight per cent vinyl chloride and 10 weight per cent acrylic acid.--

Column 2, line 28, delete "acid." and insert --maleate.--.

Column 3, line 31, delete "are: basic lead carbonate, lead orthosilicate," and insert --stearate, cadmium laurate, cadmium octoate,--

Column 4, line 28, insert --about-- between "than" and "50".

line 60, delete "180-" and insert --180°--.

Column 5, line 27, delete "grounded" and insert --ground--.

Column 7, line 16, delete "20" and insert --30--.

Signed and sealed this 22nd day of August 1972.

(SEAL)
Attest:

EDWARD M. FLETCHER, JR.                        ROBERT GOTTSCHALK
Attesting Officer                                   Commissioner of Patents